(No Model.)
E. E. G. BOZERIAN.
HYDRO THERAPEUTIC APPARATUS.
No. 246,654. Patented Sept. 6, 1881.
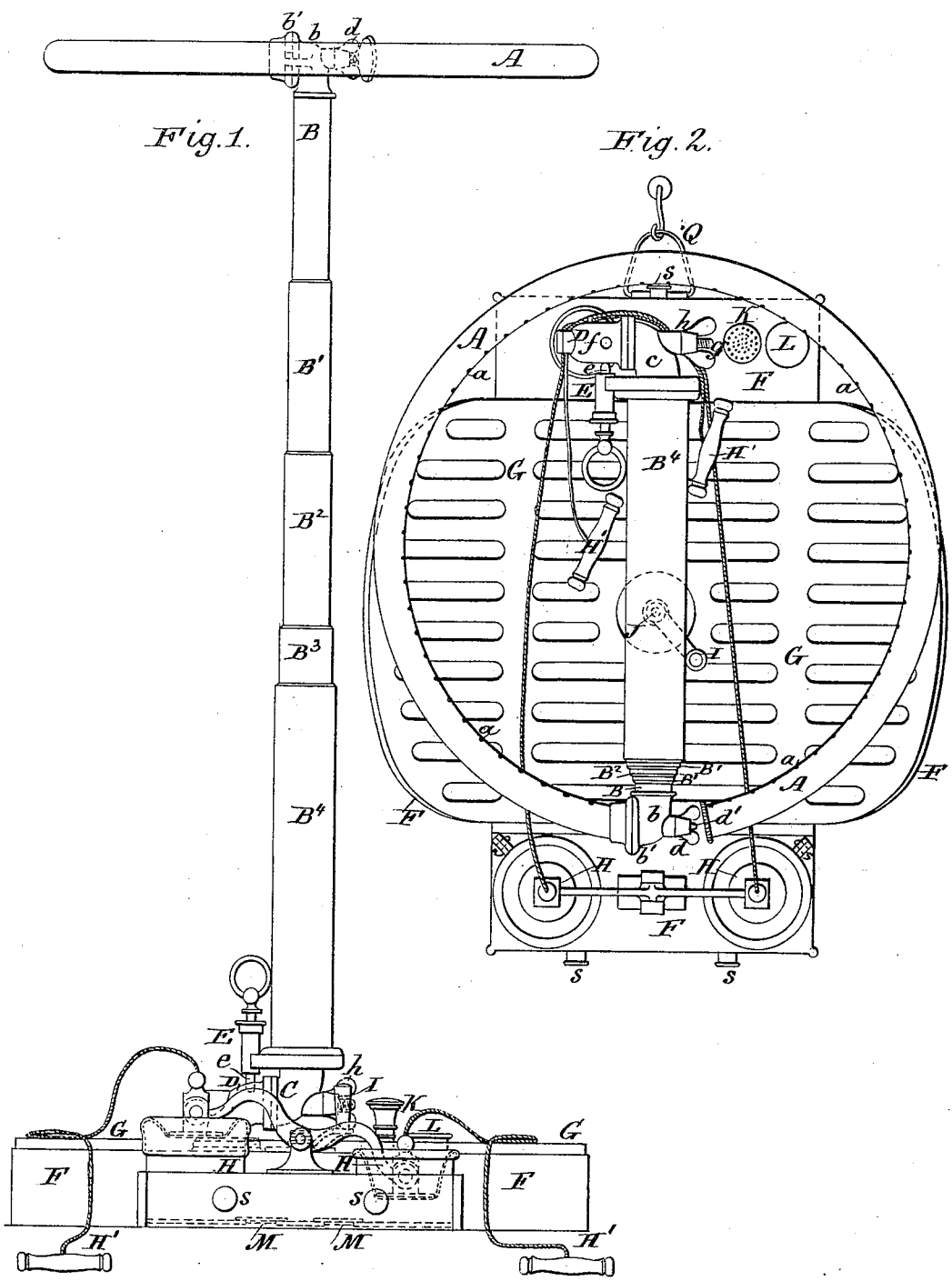
Witnesses
Inventor
E. E. G. Bozerian

UNITED STATES PATENT OFFICE.

EUGENE E. G. BOZÉRIAN, OF PARIS, FRANCE.

HYDRO-THERAPEUTIC APPARATUS.

SPECIFICATION forming part of Letters Patent No. 246,654, dated September 6, 1881.

Application filed April 27, 1881. (No model.) Patented in France February 9, 1881.

*To all whom it may concern:*

Be it known that I, EUGENE ELIE GASTON BOZÉRIAN, of Paris, in the Republic of France, have invented a certain new and useful Improvement in Hydro-Therapeutic Apparatus, of which improvement the following specification is a full description.

This invention relates to a hydro-therapeutic apparatus, which I call the "portable hydro-hygenic apparatus," and which is composed of a telescopic tube, a pump for forcing water through said tube, an annular or curved perforated pipe attached to the upper end of said tube and forming a sprinkler, and a nozzle or orifice for an ascending douche. This apparatus can in a few seconds be set up ready for use, and again folded together so as to occupy a very small space.

In the accompanying drawings, which form a part of this specification, Figure 1 shows the apparatus set up for use, and Fig. 2 the same folded and hung up on a hook.

The annular or curved pipe A, perforated on its inner periphery, as shown at $a$, is connected with the upper section, B, of a telescopic tube, comprising also the sections $B'$ $B^2$ $B^3$ $B^4$. The connection is made by an elbow, $b$, which is fixed to the section B, and which, as well as the tube A, is provided with a flange, $b'$. A screw, $d'$, fixed to the pipe A, passes through the wall of the elbow $b$, and a thumb-nut, $d$, serves to clamp the said pipe A and elbow $b$ together. By loosening the nut the pipe A can be turned on the screw $d$ and adjusted to any desired position, and by tightening the nut it can be secured in that position. Stops can be made to limit the motion when the pipe A has been turned to the position shown in Fig. 1. The lower section, $B^4$, of the telescopic tube is fastened to an elbow, $c$, and is secured to the stationary pipe D by the screw $g$ and nut $h$. The section $B^4$ carries a spring locking device, E, and in the upper surface of the pipe D is a recess, $f$, which the bolt $e$ of said device takes into when the telescopic tube is raised to a vertical position. The sections of the telescopic tube are prevented from being drawn apart by any ordinary or suitable means, such as rings and annular interior and exterior shoulders upon the ends of the sections.

The base F of the apparatus is hollow and forms the water-chamber from which the supply for the douches is derived. The pipe D communicates with its interior. A double-acting aspiration and compression pump, H, forces the water into this chamber. The water is supplied from the tub in which the apparatus is placed when in use. The inlet-valves for the pump are represented by M. The pump H has two cylinders, the pistons of which are connected by a lever, F, and operated by the person using the apparatus, or by an attendant by means of cords having handles $H'$, or by other suitable means. The base F is covered with a wooden platform, G, having a corrugated surface. In the center is an orifice, J, for the ascending douche, controlled by a valve having a handle, I, that can be worked by the foot of the person using the apparatus.

A rose, K, which usually is kept upon a pin in the position shown in Fig. 2, is screwed into the orifice J when the ascending douche is to be used.

L is a cap, which is fastened to the elbow $b$ in place of the perforated pipe A when desired, so as to close the telescopic tube and force the water to ascend solely through the orifice J. The water can at any time be allowed to escape from the base F by removing the plugs $s$. Handles for lifting can be made on the sides of the base F.

Q is a loop, by which the apparatus can be hung up when desired.

The apparatus being folded, as shown in Fig. 2, to put it into operation it is first placed in a tub. The section $B^4$, with the other portions of the telescopic tube, is turned on the screw $g$ into a vertical position, in which it is secured by the bolt $e$ of device E. The sections B $B'$ $B^2$ $B^3$ are then drawn out until the curved or annular perforated pipe A has been raised to the desired height. The nut $d$ is then loosened, and the pipe A turned on screw $d'$ until it is horizontal or at right angles to the telescopic tube, as shown in Fig. 1, when the nut $d$ is again tightened. The weight of the pipe A tends to draw the sections of the telescopic tube out of the vertical, and the friction of one upon another retains them in position. The tub in which the apparatus is placed having been supplied with water, the pump H is operated, and the water, entering through the valve M, is forced through the telescopic tube and descends in a shower through the perforations in the pipe A. The pipe A is made annular, in order that by adjusting it at the proper level water can be thrown on all parts of the body without wetting the head. To use the ascending douche at the same time, the patient or person using the apparatus turns the handle I with his foot, the rose K being first screwed into the orifice J or not, as desired.

To fold the apparatus again after use the operations before described are reversed. The annular pipe A is turned back, the sections of telescopic tube are run into each other, and the closed tube is turned down upon the base F.

It is obvious that modifications can be made in the details of the apparatus without departing from the spirit of the invention. The telescopic tube not only enables the apparatus to be reduced to a small compass, but by allowing the perforated pipe A to be adjusted up and down it adapts it to the use of different-sized persons.

Having now fully described my said invention, what I claim is—

1. In a hydro-therapeutic apparatus of the character described, the telescopic tube for conveying the water to the perforated pipe or showering device, substantially as set forth.

2. The combination of the telescopic tube, a perforated pipe or showering device, and a pump for supplying water through said tube to be delivered through the showering device or perforated pipe, substantially as described.

3. The combination of the base, the telescopic tube connected therewith by a hinge or loose joint, and the showering device or perforated pipe, substantially as described.

4. The combination of the telescopic tube and the annular perforated pipe joined to said tube by an adjustable or loose connection, substantially as described.

5. The combination of the base, the telescopic tube, and the annular perforated pipe, joined to each other by an adjustable or loose connection, substantially as described.

6. The combination of the pump, the hollow base, the telescopic tube, jointed to the base by an adjustable or loose connection, and the showering device or perforated pipe, jointed to the telescopic tube by an adjustable or loose connection, substantially as described.

7. A hydro-therapeutic apparatus comprising the hollow base, the pump, the ascending douche, the telescopic tube, and the showering device, substantially as described.

In testimony whereof I have signed my name to this specification before two subscribing witnesses.

E. E. G. BOZÉRIAN.

Witnesses:
 EMILE BARRAULT,
 AUG. VINCK.